Jan. 23, 1923.

B. H. MANN.
METHOD AND CHART FOR DETERMINING TIME TABLES.
FILED FEB. 8, 1922.

Inventor
Bertram H. Mann
By Elliott & Ammen
Attorneys

Jan. 23, 1923.

B. H. MANN.

METHOD AND CHART FOR DETERMINING TIME TABLES.

FILED FEB. 8, 1922.

Inventor
Bertram H. Mann.
By Elliott v Ammen
Attorney

Patented Jan. 23, 1923.

1,443,234

UNITED STATES PATENT OFFICE.

BERTRAM H. MANN, OF ST. LOUIS, MISSOURI.

METHOD AND CHART FOR DETERMINING TIME-TABLES.

Application filed February 8, 1922. Serial No. 534,877.

*To all whom it may concern:*

Be it known that I, BERTRAM H. MANN, a citizen of the United States, residing in the city of St. Louis and State of Missouri, have invented new and useful Improvements in Methods and Charts for Determining Time-Tables, of which the following is a specification.

This invention relates to the determination of train schedules on single track railways.

The general object of the invention is to provide a simple method and simple means for determining time-tables of departure of the trains which will give improved results in the operation of a railway. While the invention is applicable to time-tables or schedules for passenger trains, in the following specification it has been applied to the operation of freight trains. In some aspects the invention may be regarded as related to the invention disclosed in my co-pending application Serial No. 453,896, filed March 21, 1921, entitled Traffic chart and method of charting. The invention disclosed in that application enabled the performance of trains to be graphically disclosed with special reference to the time consumed by the trains in completing their run between two points or terminals on the line.

The present invention facilitates the determination of time-tables of departure for trains with special reference to weak points as disclosed by the chart and method set forth in the first application. The present invention also involves the determination of a modulus, or factor, which I call a time-cycle, and the employment of this time-cycle facilitates the adoption of a time-table which is best suited to the physical conditions of the railway line. It also tends to determine the location of points on the line where additional siding stations would appear to be necessary, in a case where it seems desirable to increase materially the capacity of the railway line.

Further objects of the invention will appear hereinafter.

The invention consists in the novel method and in the several novel charts and combinations thereof described hereinafter, all of which contribute to produce a simple and efficient method and means for facilitating the determination of a tentative or fixed time-table for single track railway lines.

Figure 3:
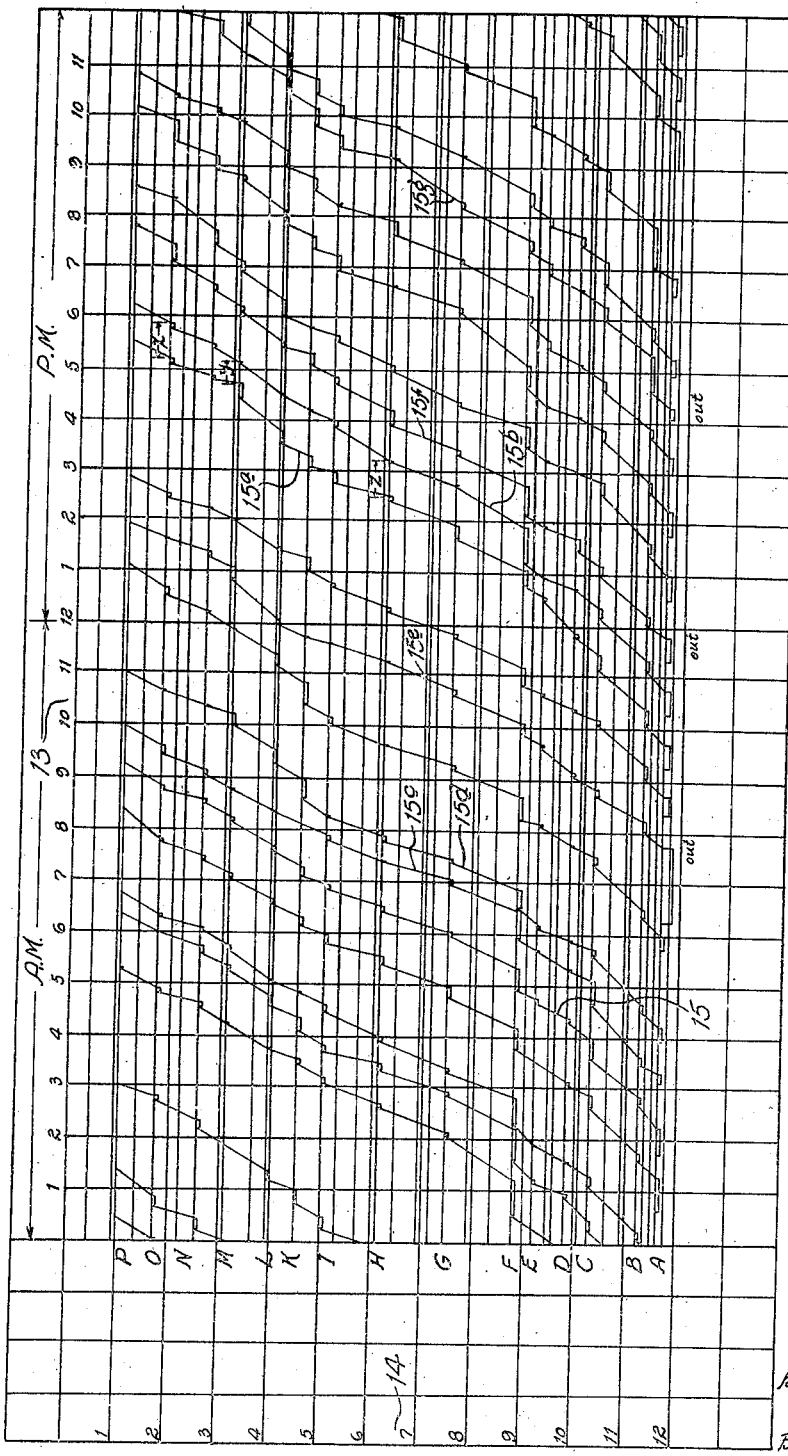
Figure 4:
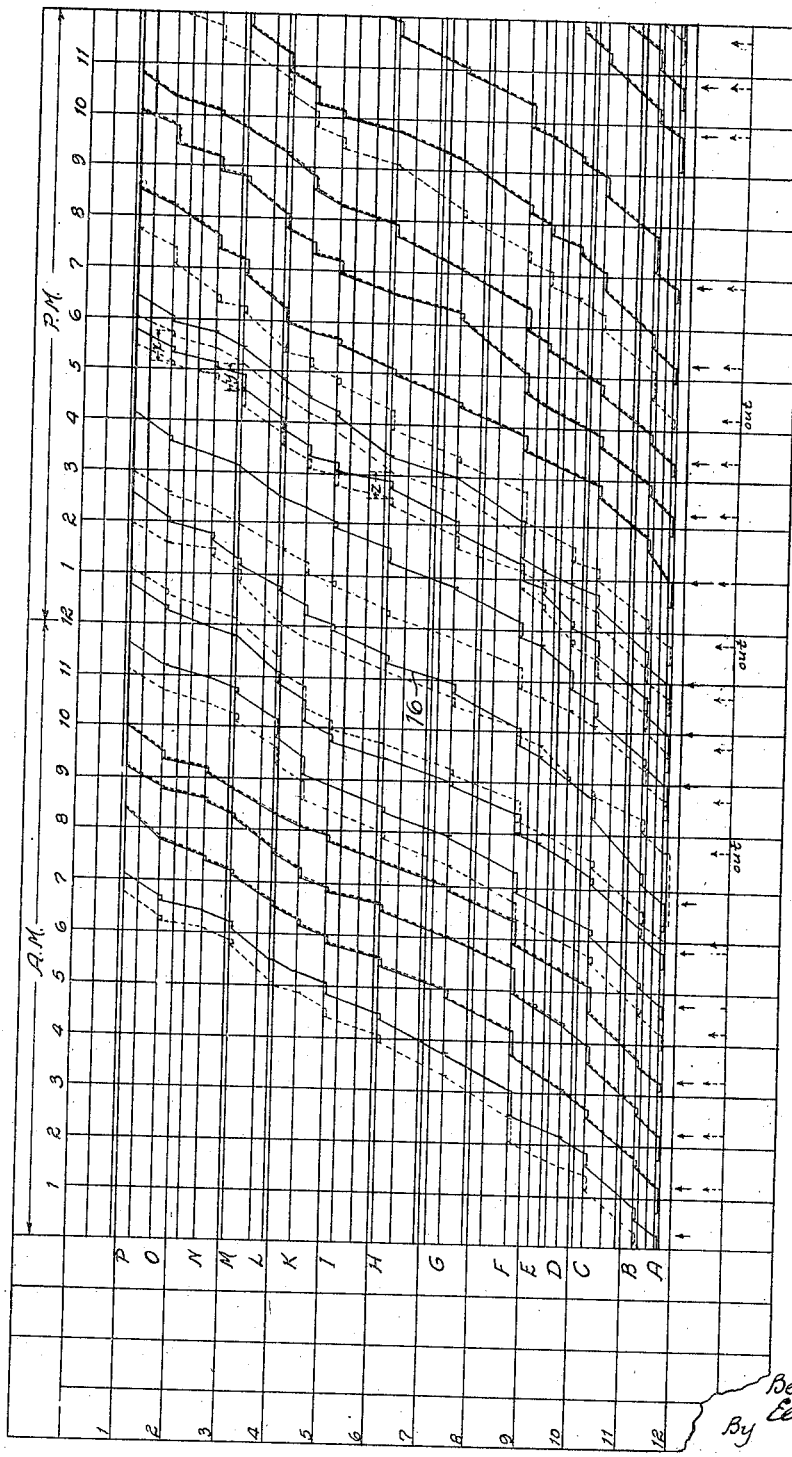

Figure 3 is a diagram or chart indicating the performance of trains passing over the line in one direction according to a hypothetical, or tentative schedule; and Figure 4 is a diagram or chart similar to Figure 3 but showing the performance of trains running upon the final or adopted time-table. This diagram also shows by means of dotted lines the relation of the final time-table to the tentative time-table of Figure 3.

In practicing my invention I prepare or employ a table of figures corresponding to all trains moving in one direction only, according to their present performance by schedule or otherwise during a test-period which may be the busiest traffic period, and the figures of this table represent the average of the time consumed between the siding stations and the average standing-time, that is to say, time consumed by trains standing at siding stations. I prepare or employ a similar table of figures corresponding to all trains moving in the opposite direction according to their existing performance by schedule or otherwise during the test period, and the figures of this table represent the average time consumed by the trains in running between siding stations and the average standing-time, that is, time consumed at siding stations.

Having obtained these two tables, I then ascertain the value of a certain period of time which I call a modulus or typical time-cycle for that railway line; the value of this time-cycle is suggested or indicated by the conditions of the railway. That is to say, this time-cycle or modulus is determined by the character of the figures of these tables, and is equivalent to the average time consumed by all trains travelling in one direction between adjacent stations plus the average time consumed between adjacent stations by all the trains travelling in the other direction. Or to express the idea in another way, it represents the average time which would be required for an average train to go from any station to an adjacent station and return to its original station, including the time consumed in waiting at both the stations.

Having determined on the value of this time-cycle or modulus, I then utilize it in determining a proposed time-table. To do this, I prefer to prepare a hypothetical or tentative time-table for trains leaving the terminal and moving in one direction only, and I base this time-table upon my selected time-cycle. I then study and modify the tentative time-table to correct any defects which may develop at any point on the line, or to meet any special requirements. The above procedure is greatly facilitated by the employment of charts or diagrams such as I shall now describe.

Figure 1:
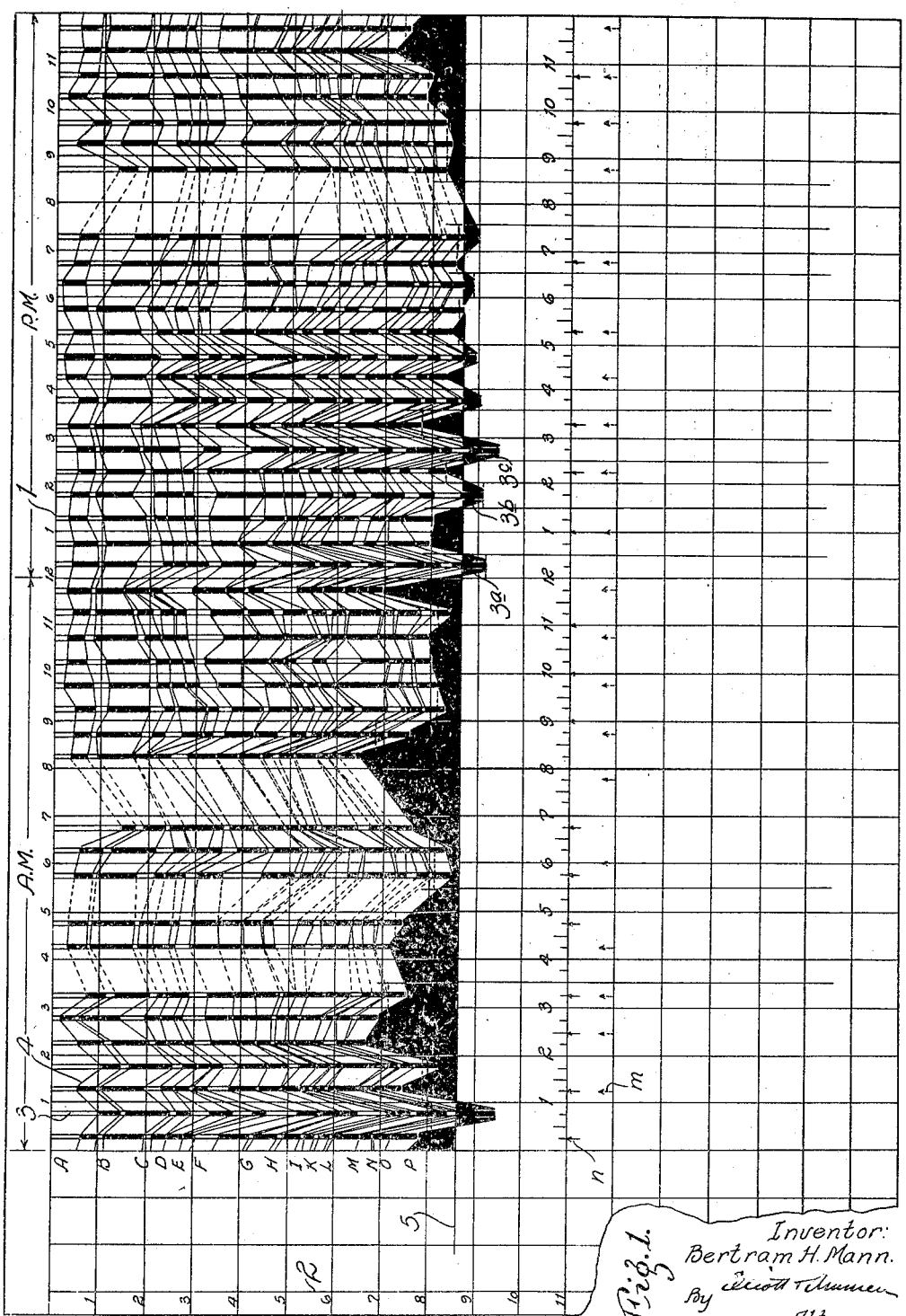
Figure 1 is a chart which indicates graphically the time of departure of trains going in one direction and also indicates the total time consumed in the runs, together with the time consumed in the movement of trains between siding stations and the time consumed by the trains while standing at the siding stations.

Figure 1 is a chart very similar to the chart shown in my co-pending application referred to above, that is to say, it has a horizontal clock-time scale 1 which is divided into equal divisions representing hours or fractions thereof. The chart also includes a running-time scale 2 which is a vertical scale, that is to say, it runs substantially at right angles to the directions of the clock-time scale. On the chart I place a plurality of train lines such as the line 3, and these train lines are located at half hour intervals on the clock-time scale, and each train line represents the average performance of any selected number of trains departing at or about that time. For example, a test period of fifteen days or longer may be used for ascertaining this average, and the time selected should be during the busiest traffic period of the road, because it is, of course, under such conditions that the weak points of a schedule, or time-table would be discovered.

Extending in the direction of the running-time scale I provide divisions in the order of, and corresponding to the terminals and siding stations along the line, and these are designated, respectively, by the capital letters A, B, C, etc. extending up to P, the terminal toward which the represented trains move.

Each train line is divided into alternating parts which are distinctive from each other, that is to say, I provide each line with alternating light and dark parts, each light portion, or part, representing the standing-time, that is, time consumed by the train at the terminals or siding stations, and the dark part representing the actual running time of the train in moving from one station to the next.

In order to enable this chart to be more intelligible throughout its entire width, I connect up the corresponding light and dark spaces of the train lines by connecting lines 4. These train lines, of course, in their total length represent the total time consumed by each typical train or average train in completing its run between the terminals. On this chart I provide a critical line 5 which is parallel with the clock-time scale, and the position of this line is determined by the time-allowance, or permitted time which the trains should take in making the run between the terminals. Some of the train lines pass considerably beyond this critical line, indicating that the performance of these trains is not so satisfactory as the performance of the trains represented by the other train lines which do not extend to the critical line. Although, of course, the performance of these overtime trains may be the best possible under the circumstances, at the same time, the projection of the train lines beyond the critical line indicates graphically a point on the time-table which invites attention and study with a view to shortening the running time of that train.

In Figure 1 in addition to the train line 3 referred to above there are a number of train lines represented by the numerals $3^a$, $3^b$, $3^c$, etc. which also project beyond the critical line.

Figure 2:
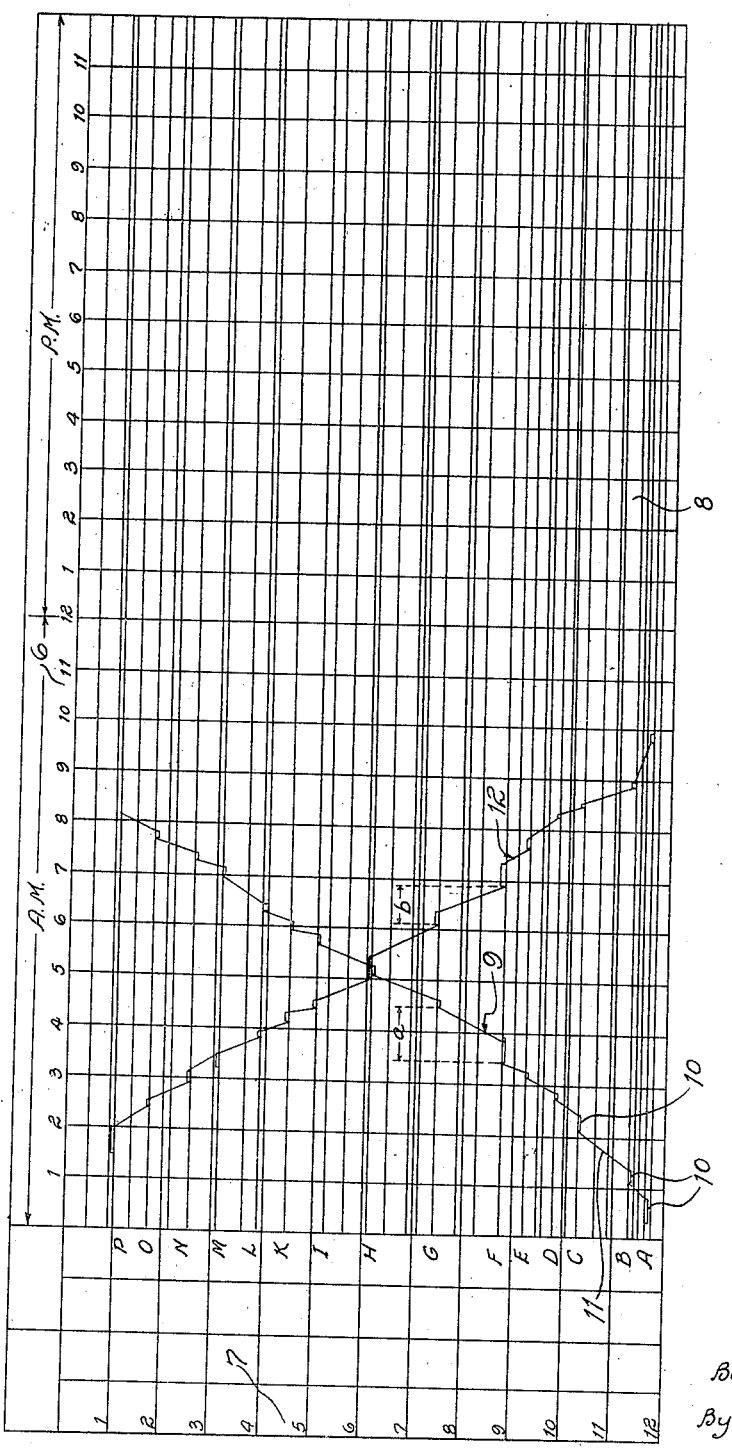
Figure 2 is a diagram or chart which represents the average performance of all trains passing in one direction, and also the average performance of all the trains passing in the opposite direction over the line; and it indicates the average time consumed at each siding station by trains passing in both directions and the time consumed in the actual run between siding stations, for both directions.

I then prepare a diagram or chart such as illustrated in Figure 2. This diagram has a clock-time scale 6 corresponding to the clock-time scale 1, and is also provided with a running-time scale 7 arranged vertically and at right angles to the clock-time scale. As in the diagram Figure 1, this diagram is also provided with indicated points or divisions in the order of and corresponding to the terminals and siding stations of the first-named chart, and lettered respectively A, B, C, etc.

From the tables of figures which have been prepared, and which represent the average time consumed by all trains at terminals and siding stations and running between such stations, but preferably from this data as presented on the diagram Figure 1, I lay off on the chart 8, shown in Figure 2, a broken line 9 having its origin at the terminal A and terminating at the terminal P. This line includes horizontal extensions 10 which extend along the horizontal lines corresponding to the siding stations and terminals; the length of each of these horizontal extensions corresponds to, and is a measure of, the average time consumed by the trains at the corresponding stations. The adjacent ends of these horizontal extensions 10 are preferably connected by inclined lines, the horizontal projections whereof represent the average running time, that is, the average time consumed by the trains in actually passing between the different stations.

Having laid off this line 9, I proceed to lay off another broken line 12 which is substantially similar to the line 9 in every respect, but laid off so as to represent the average performance of trains running in the opposite direction; I lay off this second line so that the two lines 9 and 12 intersect each other at a siding station, for example, the station H, which is substantially at the middle point of the railway line.

I then study this diagram Figure 2 with special reference to its graphical presentation of the average time consumed between stations and the average time consumed by trains standing at stations. In other words, this diagram enables me to compare graphically the average running time and average standing time of trains at and between stations throughout the entire length of the line. I have discovered that in doing this it is desirable to ascertain or determine a time-cycle or modulus which is best suited to the existing conditions of the road. This diagram enables, or assists, me to determine what this time-cycle should be.

In considering such a problem it should be remembered that on a line operating to full capacity, throughout the entire line all the trains on the line going in one direction are advanced in one general movement, meeting all the trains going in the other direction on sidings on the line, and vice versa, or it may be, passing some of the trains going in the same direction. The time consumed for one general movement in one direction plus the time consumed for one general movement in the other direction may be regarded as a cycle of movement; this is what I call the time-cycle or modulus; the time actually consumed in this time-cycle, of course, includes the standing time or waiting time of the trains at the siding stations, as well as their actual time spent in passing between stations. For example, the individual time-cycle for the stations F and G would be represented by the distance $a$ plus the distance $b$, reduced to minutes. By studying this chart or diagram I determine the value of the time-cycle which it seems advisable to adopt for the road.

This diagram is very useful in other respects. Suppose, for example, that this diagram should indicate an abnormally great amount of time consumed between two certain adjacent stations; this condition would seem to suggest the desirability of establishing another siding station in such a way as to enable this consumed time to approach more nearly to the typical time-cycle or average time-cycle which would seem adaptable for the other stations and intervals between stations; or, as another example, a study of this diagram may suggest the elimination or reduction of a grade between certain stations.

Having determined on the time-cycle which seems to be the best adapted for the conditions existing on the line, or that it seems advisable to adopt in view of contemplated improvements in the road, or operation of the line, I then proceed to adopt a hypothetical tentative time-table based on the selected time-cycle. In the present instance the time-cycle suggested is in the neighborhood of one hour, and I have therefore adopted this period as a time-cycle.

Having determined the value of this time-cycle in the present case as one hour, I then proceed to chart a hypothetical time-table, that is to say, a tentative time-table based on this time-cycle. In the present instance that would be a time-table in which the trains depart at hour intervals. I utilize the diagram Figure 1 in determining the times of departure for the hypothetical schedule or the tentative time-table. In doing this I place on this diagram a plurality of arrows $m$ which are located on the clock-time scale so as to avoid aligning any of them with any train line, such as the train line 3 and the other train lines $3^a$, $3^b$, $3^c$, etc., which represent overtime trains; these arrows $m$ are represented in dotted lines and are placed as nearly as possible at one hour intervals. In order to develop what would be the probable performance of trains departing according to this tentative time-table I prepare a chart such as illustrated in Figure 3.

This chart has a clock-time scale 13 and a running-time scale 14 similar to the corresponding scales already described in connection with Figures 1 and 2. This chart also carries indicated points or division lines designated by the letters A, B, C, respectively, which correspond to the terminals and siding stations along the railway line. I then lay off on this diagram a series of broken lines indicated collectively by the number 15. These broken lines are plotted similarly to the broken line 9 already described, on the diagram Figure 2, except that each of the broken lines 15 represents the performance which can reasonably be expected from a train leaving at the assumed time of departure indicated by the arrows $m$. The probable performance of each of the trains which are represented by the lines 15 is ascertained by reference to the train lines of Figure 1. In this connection it should be understood that the train lines of Figure 1 represent the average of performance of a large number of trains for each departure time. From the nearest train line on Figure 1 for a selected departing time, I ascertain the position and respective values which should be given to the horizontal extensions of these lines 15. The position of the overtime train lines on the chart Figure 1, will determine the departure times for the tentative or hypothetical time-table.

The relation of the charted lines 15 to each other along their length, will determine whether trains can be run satisfactorily throughout the railway line on the hypothetical schedule. For example, if it is indicated that these trains as they move along the line, will tend to maintain a distance or interval between each other corresponding to the time-cycle, it then could be assumed that these trains would operate satisfactorily, if they depart at the times selected.

As an illustration of an unworkable schedule the two lines 15$^a$ and 15$^b$ may be selected, the former of which represents a train departing at about 9:30 a. m. and the latter of which represents a train departing about 10:30 a. m. At the siding station represented by the letter O there is a horizontal distance represented by the letter $x$ between the times of departure of these two trains. The time interval or period represented by this distance $x$ is too small to conform to the adopted time-cycle. The distance $y$ indicated on Figure 3 at the station M is even smaller than the distance $x$ and shows clearly that these two trains should not be permitted to depart at the time represented.

It will, therefore be seen that this chart or diagram gives opportunity to ascertain beforehand what will probably be the effect on the traffic if trains depart at certain selected times.

An unworkable schedule is also shown by the two broken lines 15$^c$ and 15$^d$ of Figure 3 which at the stations F, G and H approach very near to each other. These conditions suggest modification of the hypothetical time-table, and in accordance with the changes indicated as necessary by the tentative diagram, Figure 3, I am assisted in preparing a final time-table such as that shown in Figure 4. The principal consideration in the adoption of the final time-table, of course, is to avoid selecting departure times for trains which will place them at or near the time of departure of the overtime trains such as indicated, for example, by the train line 3$^a$. It will be seen that the diagram Figure 1 is, therefore, very advantageous in determining the departure times which are apparently most advisable, and the diagram Figure 3 determines whether trains departing on the hypothetical time-table will operate satisfactorily out on the line, and maintain a time interval having an average value corresponding to the time-cycle.

Of course, under some conditions it may be imperative for a certain train to leave a terminal at or about a certain time. In that case due weight must be given to this requirement and this may affect the departing time of adjacent trains to a certain extent. The consideration of where and when trains should meet on the line also must be given weight in the adoption of the final time-table.

In Figure 1, I have placed a plurality of arrows $n$ indicated in full lines which represent the finally adopted departure times for the trains operating on the final time-table. It will be noted by comparison with the dotted line arrows $m$ that many of the tentative train departure times have been adopted without change in the final time-table; others have necessarily been shifted in position or eliminated altogether.

An inspection of Figure 4 will show that the broken lines representing the trains maintain at all stations a distance between them corresponding to the time-cycle, and sufficient to enable the trains to be operated effectively. In order to illustrate the relation of these two charts I have indicated in Figure 4 in dotted lines, the position of the lines 15 of Figure 3. The full lines such as the line 16 of Figure 4 represent the final or adopted time-table.

It will be noted that some of the full lines 16 of Figure 4 follow closely to the direction and contour of the tentative lines 15 of Figure 3, but others are moved considerably from their tentative position. As a result of the adoption of the final time-table represented by the lines in Figure 4, the elimination of some of the tentative trains or train lines of Figure 3 is suggested for example, those represented by the lines 15$^d$, 15$^f$, 15$^g$.

It should be understood that by proceeding as described above I establish or determine a time-table of departure for all trains leaving one of the terminals, and after I have accomplished this, I simply adopt that time-table for departure of trains for the other terminal which will fit with and correspond to the one direction time-table which I have established.

What I claim is:

1. In the art of determining a time-table for the departure of trains leaving a terminal on a single track railway line, the method which comprises determining from existing schedules or train performances, a typical time-cycle, preparing a hypothetical tentative time-table for trains leaving a terminal and moving in one direction only based on the typical time-cycle, and then modifying said time-table as may be required to insure that the period between departing times of trains from all stations may maintain an average value corresponding to the period represented by the typical time-cycle.

2. The method of determining a time-table for departure of trains leaving a terminal on a single track railway line, which comprises ascertaining the value of a typical time-cycle for the road, adopting a tentative one-direction time-table having departure times for the trains from one terminal with time intervals between their departure times based upon the time-cycle, and then modifying the tentative time-table to correct deficiencies in operation of the same.

3. The method of determining a time-table for departure of trains leaving a terminal on a single track railway line, which comprises ascertaining the value of a typical time-cycle for the road, adopting a tentative one-direction time-table having departure times for the trains from one terminal with time intervals between their departure times based upon the time-cycle, noting the departure times of over-time trains that consume an abnormal length of time in completing their runs, locating the departure times of the tentative time-table so as to avoid starting any of the trains of the tentative time-table at the departure times of the existing overtime trains, and modifying the tentative time-table to correct deficiencies in operation of the same.

4. The method of determining a time-table for departure of trains leaving a terminal on a single track railway line, which comprises ascertaining the value of a typical time-cycle for the road, adopting a tentative one-direction time-table having departure times for the trains from one terminal with time intervals between their departure times based upon the time cycle, noting the actual average performance of trains running on the existing schedule or otherwise as regards the time consumed by each in actually running between stations and in standing at stations, ascertaining the probable performance of the trains of the tentative time-table by assuming that the performance for a given tentative train will be the same as the performance of a train of the existing schedule having a departure time nearest to that of the given tentative train, and then modifying the tentative time-table where necessary to prevent tentative trains from approaching nearer to each other than the distance corresponding to the said time-cycle, when on the railway line.

5. The method of determining a time-table for departure of trains leaving a terminal on a single track railway line which comprises preparing a chart representing the average performance of trains departing at intervals throughout the day and indicating the average time consumed by the trains moving in one direction only according to their present existing schedules or performances with reference to a critical time allowance indicated on the chart and adopted as a basis or standard time allowance for completion of the run between the terminals, ascertaining a typical time-cycle for the railway line, said time-cycle consisting of the average of the running time between adjacent stations going in one direction plus their average standing time at all stations, plus the average running time of all trains moving in the other direction plus their average standing time at all stations, adopting a hypothetical tentative time-table for trains leaving one terminal and moving in one direction only with the departure times of the same placed with reference to the said chart so as to avoid the starting of any trains near the time of departure of existing trains which consume the greatest time in their run, and then modifying the tentative time table to correct defects in the same which may develop at any point on the line.

6. A chart for graphically indicating traffic conditions between two terminals for an allowable running time, comprising a time-scale indicating divisions of clock-time, a running-time scale extending substantially at right angles to the clock-time scale for indicating time consumed by trains going in one direction in their runs between the two terminals, said chart having indicated points laid off on the running-time scale to correspond to siding stations located along the line, a plurality of train lines representing the average performance of trains extending substantially parallel with the running-time scale and located at predetermined points on the clock-time scale corresponding to the time of departure of the trains represented, each of said train lines having a length corresponding to the average time consumed in the run by the trains it represents, and having means for indicating the average actual running time between the said siding stations and for indicating the average actual time consumed by the trains while standing at the siding stations, said chart having a critical line substantially parallel with the clock-time scale and located at a predetermined point on the running-time scale to indicate a predetermined limit of time permitted for the run between the two terminals.

7. Means for facilitating the determination of a time-table for departure of trains leaving a terminal on a single track railway line, consisting of a chart for graphically indicating traffic conditions between the two terminals for an allowable running time, and having a time-scale indicating divisions of clock-time, a running-time scale extending substantially at right angles to the clock-time scale for indicating time consumed by trains in their runs between the two terminals, said chart also having indicated points laid off on the running-time scale to correspond with siding stations located along the line, a plurality of train lines representing the average performance of trains extending substantially parallel with the running-time scale and located at predetermined points on the clock-time scale corresponding to the time of departure of the trains represented, each of said train lines having a length corresponding to the average time consumed in the run by the trains it represents, said train lines having means for indicating the average actual running time between the said siding stations and for indicating the average actual time consumed by the trains while standing at the siding stations, and a critical line on the chart substantially parallel with the clock-time scale and located at a predetermined point on the running-time scale to indicate a predetermined limit of time permitted for the run between the two points, in combination with a chart having a time scale indicating divisions of clock-time, a running-time scale extending substantially at right angles to the clock-time scale, for indicating time consumed by trains in their runs between the two terminals, indicated points laid off on the running time scale and corresponding to siding stations located along the line, a broken line representing the average performance of trains moving in one direction between the terminals having horizontal extensions opposite the indicated siding stations representing by their length the average time consumed by the trains moving in that direction in standing at the siding stations, the horizontal distance between said extensions measured on the clock-time scale representing the average time consumed by the trains in running between the indicated siding stations, a second broken line representing the average of trains moving in the opposite direction on a line intersecting the first line at an indicated siding station which is substantially at the middle of the railway line, said last-named broken line also having horizontal extensions opposite the different indicated siding stations representing by their length the time consumed by the trains moving in that direction in waiting at the indicated siding stations, the horizontal distances between the last named horizontal extensions measured on the clock-time scale representing the average actual running time consumed by the trains in running between the siding stations.

8. A chart for graphically indicating traffic conditions between two terminals for an allowable running time, comprising a time-scale indicating divisions of clock-time, a running-time scale for indicating time consumed by trains in their runs between the terminals, said chart having indicated points laid off on the running-time scale and corresponding to siding stations located along the line, a plurality of train lines representing the average performance of trains, extending substantially parallel with the running-time scale and located at predetermined points on the clock-time scale to correspond with the time of departure of the trains represented, each of said train lines being composed of alternating portions having a distinctive character from each other, the portions of one distinctive character having lengths corresponding to the average actual running time of the trains between the siding stations, and the portions of the other distinctive character having a length corresponding to the average actual time consumed by the trains while standing at the siding stations, and a critical line on the chart substantially parallel with the clock-time scale and located at a predetermined point on the running-time scale to indicate a predetermined limit of time permitted for the run between the two terminals.

9. Means for determining a time-table for departure of trains leaving a terminal on a single track railway line, consisting of a chart comprising a time-scale indicating divisions of clock-time, a running-time scale extending substantially at right angles to the first named time-scale for indicating time consumed by trains in their runs between the two terminals, said chart having indicated points laid off on the running-time scale and corresponding to siding stations located along the line, a plurality of train lines representing the average performance of a plurality of trains, extending substantially parallel with the running-time scale and located at predetermined points on the clock-time scale to correspond with the time of departure of the trains represented, each of said train lines being composed of alternating portions having a distinctive character from each other, the portions of one distinctive character having lengths corresponding to the average actual running time of the represented trains between the siding stations, and the portions of the other distinctive character having a length corresponding to the average actual time consumed by the represented trains while standing at the siding stations, in combination with a chart having a time-scale indicating divisions of clock-time, a running-time scale extending substantially at right angles to the clock-time scale for indicating time consumed by trains in their runs between the two terminals, indicated points laid off on the running-time scale and corresponding to the aforesaid siding stations, a broken line representing the average of trains moving in one direction between the terminals having horizontal extensions opposite the indicated siding stations equal in length to corresponding portions of the said train lines and likewise indicating the average time consumed by the trains moving in that direction in standing at the siding stations, the horizontal distances between said horizontal extensions measured on the clock-time scale indicating the average time consumed by the trains in running between the indicated siding stations.

10. Means for determining a time-table for departure of trains leaving a terminal on a single track railway line, consisting of a chart comprising a time-scale indicating divisions of clock-time, a running time scale extending substantially at right angles to the first-named time-scale for indicating time consumed by trains in their runs between the two terminals, said chart having indicated points laid off on the running-time scale and corresponding to siding stations located along the line, a plurality of train lines representing the average performance of a plurality of trains, extending substantially parallel with the running-time scale and located at predetermined points on the clock-time scale to correspond with the time of departure of the trains represented, each of said train lines being composed of alternating portions having a distinctive character from each other, the portions of one distinctive character having lengths corresponding to the average actual running time of the trains between the siding stations, and the portions of the other distinctive character having lengths corresponding to the average actual time consumed by the trains while standing at the siding stations, in combination with a chart having a time-scale indicating divisions of clock-time, a running-time scale extending substantially at right angles to the clock-time scale for indicating time consumed by trains in their runs between the two terminals, indicated points laid off on the running-time scale and corresponding to the aforesaid siding stations, a broken line starting at one terminal representing the average of trains moving in one direction between the terminals having horizontal extensions opposite the indicated siding stations equal in length to corresponding portions of the said train lines and indicating the average time consumed by the trains moving in that direction in standing at the siding stations, a second broken line starting at the other terminal and representing the average performance of trains moving in the opposite direction, said second broken line intersecting the first line at an indicated siding station which is substantially at the middle of the railway line, said last-named broken line also having horizontal extensions opposite the different indicated siding stations representing by their length the time consumed by the trains moving in that direction in standing at the indicated siding stations.

11. Means for facilitating the determination of a time-table for departure of trains leaving a terminal on a single track railway line, comprising a chart graphically representing the average performance of trains departing at different times, and comprising a running-time scale, train lines representing the average performance of the said trains, extending substantially parallel to the running-time scale for indicating time consumed by the trains in their runs between the siding stations and the time consumed at siding stations, in combination with a chart having a time-scale indicating divisions of clock-time, a running time scale extending substantially at right angles to the clock-time scale for indicating time consumed by trains in their runs between the two terminals, said last-named chart having a broken line representing the average performance of trains moving in the same direction between the said terminals, having horizontal extensions representing the average time consumed at the different siding stations and having inclined extensions connecting the said horizontal extensions, the horizontal projections of the inclined lines corresponding to the average time consumed by the trains in running between the siding stations.

12. Means for facilitating the determination of a time-table for departure of trains leaving a terminal on a single track railway line consisting of a chart having a time scale indicating divisions of clock time, a running time scale extending substantially at right angles to the clock-time scale for indicating time consumed by trains in their runs between the two terminals, indicated points laid off on the running time scale and corresponding to the siding stations located along the railway line, a broken line representing the average of trains moving in one direction between the terminals, having horizontal extensions opposite the indicated siding stations representing by their length the average time consumed by the trains moving in that direction in standing at the siding stations, a second broken line representing the average of trains moving in the opposite direction, intersecting the first line at an indicated siding station which is substantially at the middle of the railway line, said last-named broken line also having horizontal extensions opposite the different indicated siding stations representing by their length the time consumed by the trains moving in that direction in standing at the indicated siding stations.

In testimony whereof, I have hereunto set my hand.

BERTRAM H. MANN.